US012665256B2

(12) United States Patent　　(10) Patent No.:　US 12,665,256 B2
Kellner et al.　　　　　　　　　(45) Date of Patent:　Jun. 23, 2026

(54) MOTOR VEHICLE WITH AN UNDERRIDE PROTECTION PLATE

(71) Applicant: Dr. Ing. h.c. F. Porsche Aktiengesellschaft, Stuttgart (DE)

(72) Inventors: Philipp Kellner, Renningen-Malmsheim (DE); Christopher Volkmer, Niefern-Öschelbronn (DE); Simon Frieß, Kuchen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 596 days.

(21) Appl. No.: 18/133,042

(22) Filed: Apr. 11, 2023

(65) Prior Publication Data

US 2023/0327280 A1　Oct. 12, 2023

(30) Foreign Application Priority Data

Apr. 12, 2022　(DE) ..................... 10 2022 108 822.7

(51) Int. Cl.
| | |
|---|---|
| *H01M 50/383* | (2021.01) |
| *B60L 50/64* | (2019.01) |
| *B62D 25/20* | (2006.01) |
| *H01M 50/242* | (2021.01) |
| *H01M 50/249* | (2021.01) |
| (Continued) | |

(52) U.S. Cl.
CPC ........... *H01M 50/383* (2021.01); *B60L 50/64* (2019.02); *B62D 25/20* (2013.01); *H01M 50/242* (2021.01); *H01M 50/249* (2021.01);

*H01M 50/289* (2021.01); *H01M 50/358* (2021.01); *H01M 2220/20* (2013.01)

(58) Field of Classification Search
CPC ....... B62D 25/20; H01M 50/358; B60L 50/64
See application file for complete search history.

(56) References Cited

U.S. PATENT DOCUMENTS

| | | |
|---|---|---|
| 2020/0027500 A1 | 1/2020 | Heymann et al. |
| 2020/0189378 A1 | 6/2020 | Hirsch et al. |
| 2020/0384841 A1 | 12/2020 | Hirsch et al. |
| (Continued) | | |

FOREIGN PATENT DOCUMENTS

| | | |
|---|---|---|
| DE | 202016102477 U1 | 8/2017 |
| DE | 102016005264 A1 | 11/2017 |
| (Continued) | | |

*Primary Examiner* — Valentin Neacsu
*Assistant Examiner* — Hosam Shabara
(74) *Attorney, Agent, or Firm* — Buchanan Ingersoll & Rooney PC

(57)　　ABSTRACT

A motor vehicle having an electrical energy reservoir with a battery housing having at least one fluid outflow opening. An underride protection plate is arranged below the electrical energy reservoir. At least a first flow channel is configured between the battery housing and the underride protection plate. At least a second flow channel is configured within the underride protection plate. The underride protection plate includes at least one inflow opening to the at least one second flow channel and at least one outflow opening from the at least one second flow channel. The at least one fluid outflow opening of the battery housing communicates with the at least one inflow opening by way of the at least one first flow channel.

9 Claims, 3 Drawing Sheets

(51) Int. Cl.
    *H01M 50/289*      (2021.01)
    *H01M 50/358*      (2021.01)

(56)               References Cited

U.S. PATENT DOCUMENTS

| | | | | |
|---|---|---|---|---|
| 2022/0212530 | A1* | 7/2022 | Rausch | B60K 11/02 |
| 2023/0135353 | A1* | 5/2023 | Hadler | H01M 50/213 |
| | | | | 429/82 |
| 2023/0286396 | A1* | 9/2023 | Keller | H01M 50/367 |
| 2024/0034411 | A1* | 2/2024 | Maltisotto | H01M 50/30 |

FOREIGN PATENT DOCUMENTS

| | | | | |
|---|---|---|---|---|
| DE | 102017206986 A1 | | 10/2018 | |
| DE | 102020001540 A1 | * | 9/2021 | ......... H01M 50/358 |
| DE | 102020003193 A1 | | 12/2021 | |
| DE | 102020118892 A1 | | 1/2022 | |
| WO | 2018197202 A1 | | 11/2018 | |

\* cited by examiner

Bow

Rear

MOTOR VEHICLE WITH AN UNDERRIDE PROTECTION PLATE

CROSS-REFERENCE TO RELATED APPLICATION

This application claims priority to German Patent Application No. 10 2022 108 822.7, filed Apr. 12, 2022, the content of such application being incorporated by reference herein in its entirety.

FIELD OF THE INVENTION

The invention relates to a motor vehicle with an under-body protection plate.

BACKGROUND OF THE INVENTION

In electrically driven motor vehicles with an electric drive unit and an electrical energy reservoir having battery cells, degassing devices in the region of the electrical energy reservoir are known so as to be able to selectively remove gases from the electrical energy reservoir that can form in a thermal event, for example in the event of an internal fault or in the event of damage to a battery cell of the electrical energy reservoir. The removal of hot gases from the electrical energy reservoir system is intended to prevent the hot gases in the electrical energy reservoir system from causing even greater damage, for example damage to further battery cells, so that a chain reaction of damaging further battery cells is thus prevented.

A degassing device from an electrical energy reservoir unit has become known, for example, from DE 10 2020 001 540 A1, which is incorporated by reference herein. In so doing, the escaping gas on the sides of the battery housing of the electrical energy reservoir system is dissipated from the battery housing out of openings and introduced into openings of a supporting structure of the body and dissipated through the structure.

However, this type of dissipation of hot gases is not preferred, because it is used in order to direct the hot gases out of the electrical energy reservoir near the vehicle interior, where passengers can be at risk and/or plastic parts of the interior could melt or burn.

In motor vehicles with an electric drive unit, an electrical energy reservoir unit, and such a degassing device, there is still the problem that the exiting hot gases could mix with air, and the hot gases could ignite due to the mixing of the hot gases with the oxygen of the air, so that other objects could also be set on fire. This must be avoided.

It is also known that an underride protection plate is provided below the electrical energy reservoir, which constitutes a mechanical protection of the electrical energy reservoir.

SUMMARY OF THE INVENTION

Described herein is a motor vehicle with an underride protection plate having an improved possibility of gas dissipation, which allows safe dissipation of the hot gases from an electrical energy reservoir in an inexpensive manner.

An embodiment example of the invention relates to a motor vehicle having an electrical energy reservoir with a battery housing having at least one fluid outflow opening, wherein an underride protection plate is arranged below the electrical energy reservoir and wherein at least a first flow channel is configured between the battery housing and the underride protection plate and at least a second flow channel is configured within the underride protection plate, wherein the underride protection plate comprises at least one inflow opening to the at least one second flow channel and at least one outflow opening from the at least one second flow channel, wherein the at least one fluid outflow opening of the battery housing communicates with the at least one inflow opening by means of the at least one first flow channel.

It is advantageous when at least a first spacer element is arranged or a plurality of first spacer elements are arranged between the battery housing and the underride protection plate in order to form the at least one first flow channel between the bottom of the battery housing and the top of the underride protection plate. The first spacer or spacer elements are walls, structures, or the like in order to form the at least one first flow channel.

It is also expedient when the at least one first spacer element or the first spacer elements are arranged and configured such that the at least one first flow channel or the first flow channels follow a meandering course.

It is also advantageous when the at least one first spacer element is configured by a layer-like component, in particular by an intermediate plate.

It is also advantageous in a further embodiment example when the underride protection plate comprises an at least two-layer structure having a first outer plate, a second outer plate, and at least one second spacer element or second spacer elements arranged between the two outer plates for forming the at least one second flow channel between the first outer plate and the second outer plate.

It is advantageous when the at least one second spacer element is configured or the second spacer elements are configured by an intermediate plate. The second spacer element or the second spacer elements are walls, structures, or the like for forming the at least one second flow channel.

It is also expedient when the at least one second spacer element or the second spacer elements are arranged and configured such that the at least one second flow channel or the second flow channels follow a meandering course.

It is also advantageous when the at least one first flow channel and the at least one second flow channel are arranged substantially above one another and/or the at least one first spacer element and the at least one second spacer element are arranged substantially above one another.

It is also expedient when the at least one fluid outflow opening is arranged substantially in the center of the motor vehicle when viewed in the transverse direction and/or arranged laterally towards the driver side of the motor vehicle and/or laterally towards the passenger side of the motor vehicle, and/or that the at least one inflow opening is arranged substantially in the center of the motor vehicle when viewed in the transverse direction and/or laterally towards the driver side of the motor vehicle and/or laterally towards the passenger side of the motor vehicle, and/or that the at least one outflow opening is arranged substantially in the center of the motor vehicle when viewed in the transverse direction and/or laterally towards the driver side of the motor vehicle and/or laterally towards the passenger side of the motor vehicle.

In a further embodiment example, it is expedient when the at least one fluid outflow opening is arranged substantially in the center of the motor vehicle when viewed in the longitudinal direction and/or arranged forward in the direction of the front of the motor vehicle and/or rearward in the direction of the rear of the motor vehicle, and/or that the at least one inflow opening is arranged substantially in the center of the motor vehicle when viewed in the longitudinal direction and/or forward in the direction of the front of the motor vehicle and/or rearward in the direction of the rear of the motor vehicle, and/or that the at least one outflow opening is arranged substantially in the center of the motor vehicle when viewed in the longitudinal direction and/or forward in the direction of the front of the motor vehicle and/or rearward in the direction of the rear of the motor vehicle.

BRIEF DESCRIPTION OF THE DRAWINGS

The invention is described in detail below on the basis of an embodiment example with reference to the drawings. The drawings show.

DETAILED DESCRIPTION OF THE INVENTION

The invention relates to a motor vehicle 1 having an electrical energy reservoir 4 and having an underride protection plate 2.

Figure 1:
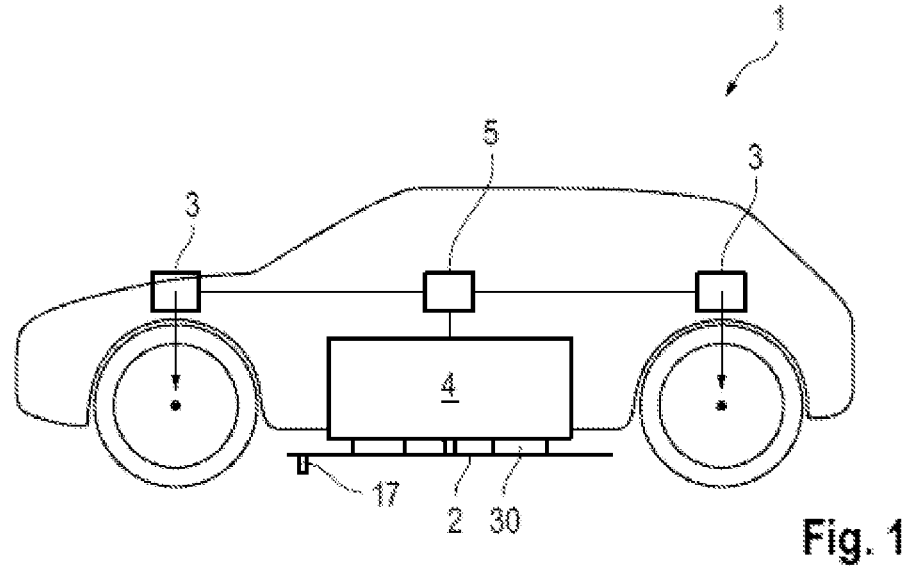
FIG. 1 depicts a schematic view of a motor vehicle according to aspects of the invention.

FIG. 1 schematically shows a motor vehicle 1 with at least one electric drive unit 3, here with two electric drive units 3, and with an electrical energy reservoir 4. The control of the electric drive unit 3 or the electric drive units 3 and/or the electric energy reservoir 4 is carried out by means of the control unit 5.

Because the electrical energy reservoir 4 is arranged in the floor region of the motor vehicle 1 in the manner of a sub-floor battery, an underride protection plate 2 is arranged below the electrical energy reservoir 4 in order to protect the electrical energy reservoir 4. This underride protection plate 2 receives impacts from below, for example, when the motor vehicle 1 is sitting on the ground, driving against an obstacle, etc.

Figure 2:
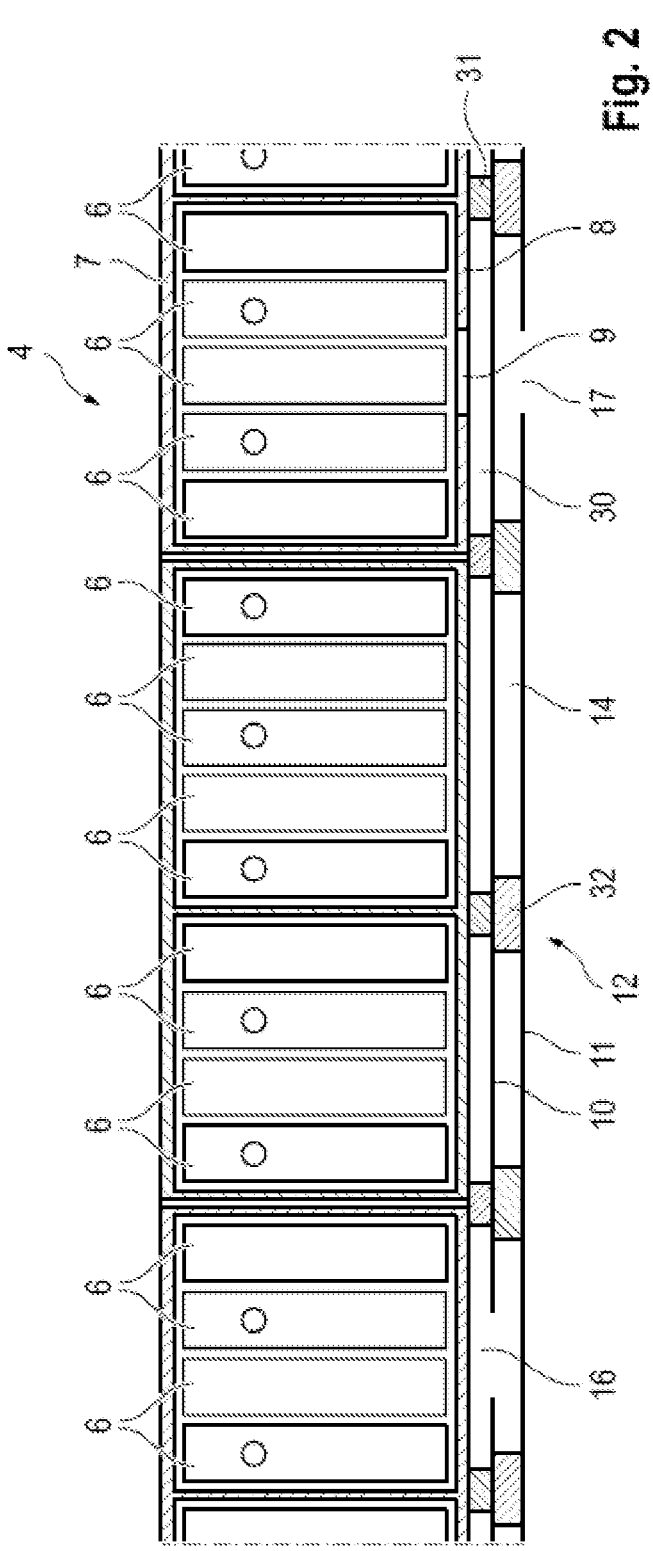
FIG. 2 depicts a cross-sectional view of a housing of an electrical energy reservoir having an underride protection plate with at least a first flow channel between the battery housing and the underride protection plate and with at least a second flow channel in the underride protection plate according to an embodiment example.

FIG. 2 shows a schematic view of an underride protection plate 2. The underride protection plate 2 is arranged underneath an electrical energy reservoir 4. The electrical energy reservoir 4 comprises a battery housing 7 with battery cells 6 arranged therein. At least one fluid outlet 9 is provided in a lower wall 8, through which a hot gas can escape from the battery housing 7, for example if this occurs in the event of a defect.

According to the embodiment example of FIG. 2 shown in the present invention, at least a first flow channel 30 is configured between the battery housing 7 and the underride protection plate 2.

Furthermore, at least a second flow channel 14 is configured within the underride protection plate 2.

The underride protection plate 2 comprises at least one inflow opening 16 to the at least one second flow channel 14 and at least one outflow opening 17 from the at least one second flow channel 14.

In the exemplary embodiment shown, the at least one fluid outflow opening 9 of the battery housing 7 is fluidly connected to the at least one inflow opening 16 by means of the at least one first flow channel 30, such that a gas generated in the battery housing, for example a hot gas, can flow out of the battery housing 7 through the at least one fluid outflow opening 9, can flow into the first flow channel 30 between the battery housing 7 and the underride protection plate 2, can flow there along the first flow channel 30, and can then flow into the second flow channel 14 in the underride protection plate 2 through the inlet opening 16, can flow there along the second flow channel 14, and can then flow out into the environment at the outlet 17. The gas can then be cooled in the first flow channel 30 as well as the second flow channel 14 prior to being dissipated into the environment.

In order to form the at least one first flow channel 30 between the bottom of the battery housing 7 and the top of the underride protection plate 2, at least one first spacer 31 is arranged or a plurality of first spacer elements 31 are arranged between the battery housing 7 and the underride protection plate 2, which causes the spacing of the underride protection plate 2 opposite the battery housing 7 and define(s) the design of the first flow channel 30.

Figure 3:
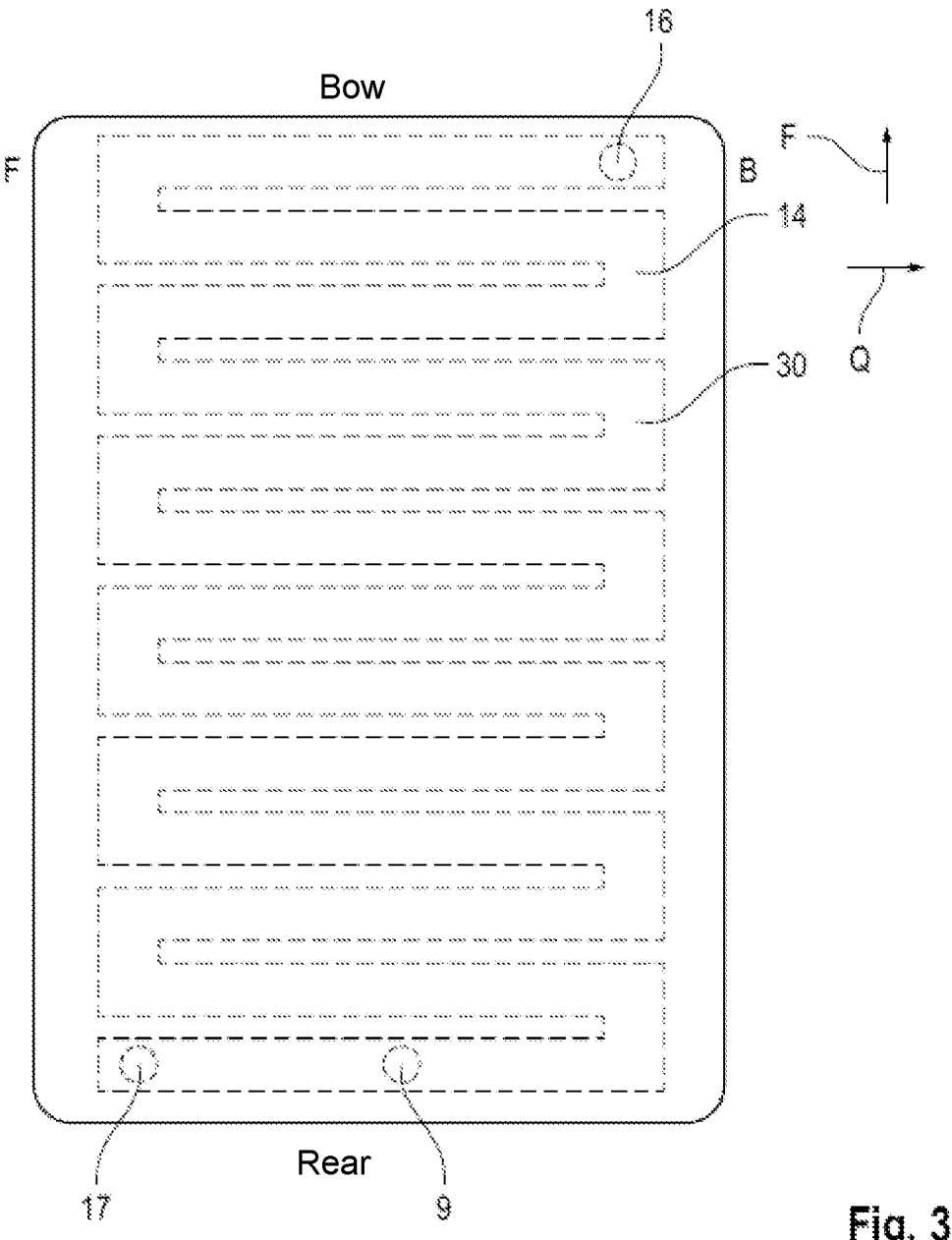
FIG. 3 depicts a view of the arrangement of the first flow channel and the second flow channel.

The at least one first spacer element 31 or the first spacer elements 31 are arranged and configured such that the at least one first flow channel 30 or the first flow channels 30 follow a meandering course, see FIG. 3. This causes the first flow channel 30 to be as long as possible in order to cause a good cooling of the gas along the first flow channel 30.

Advantageously, the at least one first spacer element 31 is configured by a layer-like component, in particular by an intermediate plate. Thus, the overall design of the first spacer element 31 or the first spacer elements 31 can be achieved by the addition of a plate. Alternatively, the at least one first spacer element 31 can also be configured otherwise, for example by a plurality of individual webs, by applying glue material, for example in the form of glue bead, etc.

The underride protection plate 2 comprises an at least two-layer structure having a first outer plate 10, a second outer plate 11, and at least one second spacer element 32 or second spacer elements 32 arranged between the two outer plates for forming the at least one second flow channel 14 between the first outer plate 10 and the second outer plate 11.

Accordingly, the underride protection plate 2 can have an at least two-layer or three-layer construction with a first outer plate 10, a second outer plate 11, and at least a second spacer element 32, and/or optionally with an intermediate plate 12 arranged between the two outer plates 10, 11, wherein the intermediate layer 12 then forms the spacer elements 32 or the spacer element 32. Accordingly, the at least one second spacer 32 or the second spacer 32 can be configured by an intermediate plate 12.

It is also optionally advantageous when the at least one second spacer element 32 or the second spacer elements 32 are arranged and configured such that the at least one second flow channel 14 or the second flow channels 14 follow a meandering course. see FIG. 3. This causes the second flow channel 14 to be as long as possible in order to cause a good cooling of the gas along the second flow channel 14.

According to FIG. 2, it can also be seen that the at least one first flow channel 30 and the at least one second flow channel 14 are arranged substantially above one another and/or the at least one first spacer element 31 and the at least one second spacer element 32 are arranged substantially above one another. This causes the first flow channel 30 and the second flow channel 14 to be substantially similar in design. This is also shown in FIG. 3. The two flow channels 30, 14 run substantially identically over one another.

In FIG. 3, the fluid outflow opening 9 from the battery housing 7 into the first flow channel 30, the inflow opening 16 into the underride protection plate 2 and into the second flow channel 14, and the outflow opening 17 from the underride protection plate 2 and out of the second flow channel 14 are also drawn.

The direction of travel F of the motor vehicle and the transverse direction Q of the motor vehicle are shown in FIG. 3.

According to an embodiment example, the at least one fluid outlet 9 is arranged substantially in the center of the motor vehicle when viewed in the transverse direction Q, see FIG. 3. Alternatively or additionally, the at least one fluid outflow opening 9 can also be arranged laterally towards the driver side F of the motor vehicle and/or laterally towards the passenger side B of the motor vehicle.

The at least one inlet opening 16 can also be arranged substantially in the center of the motor vehicle when viewed in the transverse direction Q and/or arranged laterally towards the driver side F of the motor vehicle and/or laterally towards the passenger side B of the motor vehicle, see FIG. 3.

The at least one outlet opening 17 can also be arranged substantially in the center of the motor vehicle when viewed in the transverse direction Q and/or arranged laterally towards the driver side F of the motor vehicle, see FIG. 3, and/or laterally towards the passenger side B of the motor vehicle.

With the design of the flow channels 30, 14 and the arrangement of the openings 9, 16, 17, the entire surface of the underride protection plate 2 can be meaningfully utilized. The discernible meandering path of the two flow channels 30, 14 serves to better cool the flowing fluid.

It is also advantageous when the at least one fluid outflow opening 9 is arranged substantially in the center of the motor vehicle when viewed in the longitudinal direction F and/or is arranged forwards in the direction of the front of the motor vehicle and/or rearward in the direction of the rear of the motor vehicle, see FIG. 3.

It is also advantageous when the at least one inflow opening 16 is arranged substantially in the center of the motor vehicle when viewed in the longitudinal direction F and/or is arranged forwards in the direction of the front of the motor vehicle, see FIG. 3, and/or rearward in the direction of the rear of the motor vehicle.

It is also expedient when the at least one outflow opening 17 is arranged substantially in the center of the motor vehicle when viewed in the longitudinal direction and/or is arranged forwards in the direction of the front of the motor vehicle and/or rearward in the direction of the rear of the motor vehicle, see FIG. 3.

As an alternative to the design in which the first flow channel 30 is arranged over the second flow channel 14, it can also be advantageous when the first flow channel 30 is arranged upstream/downstream of the second flow channel 14 and/or the first flow channel is arranged next to the second flow channel 14.

In a further preferred embodiment, a gas exiting the battery housing 7 downward is first directed through the first flow channel 30 between the battery housing 7 and the underride protection plate 2 forward in the direction of the front of the motor vehicle or rearward in the direction of the rear of the motor vehicle, and thereafter is directed through the inlet opening 16 towards the opposite direction forward or rearward within the second flow channel 14 within the underride protection plate 2, and at the end thereof, the gas is conducted to the surrounding environment or towards further components at the outlet opening 17.

In a further preferred embodiment, a gas exiting the battery housing 7 downward is first directed into the second flow channel 14 within the underride protection plate 2, therein directed forward in the direction of the front of the motor vehicle or rearward in the direction of the rear of the motor vehicle, and thereafter directed through a connection opening through the first flow channel 30 between the battery housing 7 and the underride protection plate 2 to the opposite direction forward or rearward in the vehicle, and at the end thereof, the gas is conducted into the environment or further components.

In an alternative embodiment, a portion of the gases exiting on a first side of the battery housing 7, in particular through a first channel to a second side opposite the first side, and gases exiting from a second side of the battery housing 7 can be directed through a second channel to the first side and can exit there.

LIST OF REFERENCE NUMBERS

1 Motor vehicle
2 Underride protection plate
3 Drive unit
4 Energy reservoir
5 Control unit
6 Battery cells
7 Battery housing
8 Wall
9 Fluid outflow opening
10 Outer plate
11 Outer plate
12 Intermediate plate
14 Second flow channel
16 Inflow opening
17 Outflow opening
31 First flow channel
31 First spacer element
32 Second spacer element

What is claimed is:

1. A motor vehicle comprising:
an electrical energy reservoir including a battery housing having at least one fluid outflow opening,
an underride protection plate arranged below the electrical energy reservoir,
at least one first flow channel disposed between the battery housing and the underride protection plate and at least one second flow channel is disposed within the underride protection plate,
wherein the underride protection plate comprises an at least two-layer structure having a first outer plate, a second outer plate, and one or more underride protection plate spacer elements arranged between the two outer plates for forming the at least one second flow channel between the first outer plate and the second outer plate,
wherein the underride protection plate further comprises at least one inflow opening to the at least one second flow channel and at least one outflow opening from the at least one second flow channel,
wherein the at least one fluid outflow opening of the battery housing communicates with the at least one inflow opening by way of the at least one first flow channel.

2. The motor vehicle according to claim 1, further comprising one or more first spacer elements arranged between the battery housing and the underride protection plate in order to form the at least one first flow channel between a bottom side of the battery housing and a top side of the underride protection plate.

3. The motor vehicle according to claim 2, wherein the one or more first spacer elements are arranged and configured such that the at least one first flow channel follows a meandering course.

4. The motor vehicle according to claim 2, wherein the one or more first spacer elements constitute a layer-like component including an intermediate plate.

5. The motor vehicle according to claim 1, wherein the one or more underride protection plate spacer elements include an intermediate plate.

6. The motor vehicle according to claim 1, wherein the one or more underride protection plate spacer elements are arranged and configured such that the at least one second flow channel follows a meandering course.

7. The motor vehicle according to claim 1, wherein the at least one first flow channel and the at least one second flow channel are arranged substantially above one another and/or the one or more first spacer elements and the one or more underride protection plate spacer elements are arranged substantially above one another.

8. A motor vehicle comprising:
an electrical energy reservoir including a battery housing having at least one fluid outflow opening,
an underride protection plate arranged below the electrical energy reservoir,
at least one first flow channel disposed between the battery housing and the underride protection plate and at least one second flow channel is disposed within the underride protection plate,
wherein the underride protection plate comprises at least one inflow opening to the at least one second flow channel and at least one outflow opening from the at least one second flow channel,
wherein the at least one fluid outflow opening of the battery housing communicates with the at least one inflow opening by way of the at least one first flow channel,
wherein the at least one fluid outflow opening is arranged substantially in a center of the motor vehicle when viewed in a transverse direction and/or arranged laterally towards a driver side of the motor vehicle and/or laterally towards a passenger side of the motor vehicle, and/or that the at least one inflow opening is arranged substantially in the center of the motor vehicle when viewed in the transverse direction and/or laterally towards the driver side of the motor vehicle and/or laterally towards the passenger side of the motor vehicle, and/or that the at least one outflow opening is arranged substantially in the center of the motor vehicle when viewed in the transverse direction and/or laterally towards the driver side of the motor vehicle and/or laterally towards the passenger side of the motor vehicle.

9. A motor vehicle comprising:
an electrical energy reservoir including a battery housing having at least one fluid outflow opening,
an underride protection plate arranged below the electrical energy reservoir,
at least one first flow channel disposed between the battery housing and the underride protection plate and at least one second flow channel is disposed within the underride protection plate,
wherein the underride protection plate comprises at least one inflow opening to the at least one second flow channel and at least one outflow opening from the at least one second flow channel, wherein the at least one fluid outflow opening of the battery housing communicates with the at least one inflow opening by way of the at least one first flow channel,
wherein the at least one fluid outflow opening is arranged substantially in a center of the motor vehicle when viewed in a longitudinal direction and/or arranged forward in a direction of a front of the motor vehicle and/or rearward in the direction of a rear of the motor vehicle, and/or that the at least one inflow opening is arranged substantially in the center of the motor vehicle when viewed in the longitudinal direction and/or forward in the direction of the front of the motor vehicle and/or rearward in the direction of the rear of the motor vehicle, and/or that the at least one outflow opening is arranged substantially in the center of the motor vehicle when viewed in the longitudinal direction and/or forward in the direction of the front of the motor vehicle and/or rearward in the direction of the rear of the motor vehicle.

* * * * *